(12) United States Patent
Zhan et al.

(10) Patent No.: US 12,532,224 B2
(45) Date of Patent: Jan. 20, 2026

(54) PARAMETER ADJUSTMENT METHOD, SERVER, AND STORAGE MEDIUM

(71) Applicant: ZTE CORPORATION, Shenzhen (CN)

(72) Inventors: Yong Zhan, Shenzhen (CN); Wei Sun, Shenzhen (CN); Wei Si, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 672 days.

(21) Appl. No.: 17/918,870

(22) PCT Filed: Jan. 25, 2021

(86) PCT No.: PCT/CN2021/073546
§ 371 (c)(1),
(2) Date: Jun. 1, 2023

(87) PCT Pub. No.: WO2021/208557
PCT Pub. Date: Oct. 21, 2021

(65) Prior Publication Data
US 2024/0056892 A1    Feb. 15, 2024

(30) Foreign Application Priority Data

Apr. 17, 2020 (CN) .......................... 202010306902.3

(51) Int. Cl.
*H04W 24/02* (2009.01)
*H04W 28/18* (2009.01)

(52) U.S. Cl.
CPC ........... *H04W 28/18* (2013.01); *H04W 24/02* (2013.01)

(58) Field of Classification Search
CPC ................. H04L 12/28; H04L 12/50
(Continued)

(56) References Cited

U.S. PATENT DOCUMENTS 12,335,172 B2 *  6/2025  Zhu ....................... H04L 5/0032
2008/0310320 A1   12/2008  Kim et al.
2015/0111593 A1    4/2015  Farkas et al.

FOREIGN PATENT DOCUMENTS

CN    102281571 A    12/2011
CN    102292929 A    12/2011
(Continued)

OTHER PUBLICATIONS

Supplemental Search Report in Chinese Application No. 2020103069023, dated Apr. 11, 2025, 5 pages, including translation.
(Continued)

*Primary Examiner* — Dang T Ton
(74) *Attorney, Agent, or Firm* — Morgan, Lewis & Bockius LLP (57) ABSTRACT

Provided are a parameter adjustment method, a server, and a storage medium. The parameter adjustment method comprises: acquiring an index value of a first performance index of a device; searching for superiority of each of a plurality of candidate values for a target operation parameter of the device on the basis of the index value of the first performance index, wherein the superiority of each of the plurality of candidate values refers to a superiority level of each of the plurality of candidate values that each of the plurality of candidate values is set to the target operation parameter on the basis of the index value of the first performance index; and selecting one candidate value as a set value of the target operation parameter after the adjustment according to the searched superiority of each of the plurality of candidate values.

11 Claims, 4 Drawing Sheets

(58) Field of Classification Search
USPC .............................. 370/329, 401, 402, 403
See application file for complete search history.

(56) References Cited

FOREIGN PATENT DOCUMENTS

| | | |
|---|---|---|
| CN | 103166746 A | 6/2013 |
| CN | 105264974 A | 1/2016 |
| CN | 108810921 A | 11/2018 |
| CN | 110381539 A | 10/2019 |
| EP | 3618484 A1 | 3/2020 |
| WO | WO20160188361 A1 | 12/2016 |
| WO | WO20180196834 A1 | 11/2018 |
| WO | WO20190247975 A1 | 12/2019 |
| WO | WO2020021504 A1 | 1/2020 |

OTHER PUBLICATIONS

Office Action in Chinese Application No. 20010306902.3, dated Apr. 16, 2025, 14 pages, including translation.
Chinese Search Report in Application No. 2020103069023, dated Oct. 28, 2024, 9 pages including English translation.
Chinese Office Action in Application No. 2020103069023, dated Oct. 28, 2024, 15 pages including English translation.
Gu, Xinyu, "Research on Intelligent Self-Optimization Technology for Future Mobile Communication Network", Information and Communications Technology and Policy No. 11, China Academic Journal Electronic Publishing House, Nov. 11, 2018, pp. 20-25.
International Search Report in Application No. PCT/CN2021/073546 dated Apr. 15, 2021, 4 pages, including English translation.
Extended European Search Report in Application No. 21788891.6 dated May 3, 2024, 12 pages.

* cited by examiner

PARAMETER ADJUSTMENT METHOD, SERVER, AND STORAGE MEDIUM

CROSS REFERENCE TO RELATED APPLICATIONS

This is a National Stage Application filed under 35 U.S.C. 371 based on International Patent Application No. PCT/CN2021/073546, filed on Jan. 25, 2021, which claims priority to Chinese Patent Application No. 202010306902.3 filed with the China National Intellectual Property Administration (CNIPA) on Apr. 17, 2020, the disclosures of both of which are incorporated herein by reference in their entireties.

TECHNICAL FIELD

The present application relates to the field of communications, for example, to a parameter adjustment method, a server, and a storage medium.

BACKGROUND

A wireless communication system includes a Long-Term Evolution (LTE) system, a New Radio (NR) system, and the like. A base station in the wireless communication system is an important part of the wireless communication system. With the increase of the complexity of the design of the base station, parameters of the base station are becoming more and more. For the sake of flexibility, personalization requirements, special scenario requirements, performance optimization, and the like, the base station provides parameters that are adjusted as required, but a network optimization engineer is required to select the required parameters through procedures of analysis, adjustment, observation, and the like and perform manual adjustments.

At least the following problems exist in the related art: a lot of human resources are consumed to manually adjust parameters, and the manually selected parameters may be inaccurate.

SUMMARY

The present application provides a parameter adjustment method, a server, and a storage medium, to achieve the object of automatically adjusting a parameter to obtain the parameter with higher accuracy.

A parameter adjustment method is provided. The method includes the following.

An index value of a first performance index of a device is acquired; superiority of each of a plurality of candidate values for a target operation parameter of the device on the basis of the index value of the first performance index is searched for, where the superiority of each of the plurality of candidate values refers to a superiority level of each of the plurality of candidate values that each of the plurality of candidate values is set as the target operation parameter on the basis of the index value of the first performance index; and one candidate value is selected as a set value of the target operation parameter after the adjustment according to the searched superiority of each of the plurality of candidate values.

A server is further provided. The server includes at least one processor and a memory communicatively connected to the at least one processor, where the memory stores instructions executable by the at least one processor, and the instructions are executed by the at least one processor to enable the at least one processor to perform the parameter adjustment method described above.

A non-transitory computer-readable storage medium is further provided. The non-transitory computer-readable storage medium is configured to store a computer program, and the computer program, when executed by a processor, performs the parameter adjustment method described above.

DETAILED DESCRIPTION

Various embodiments of the present application are described below in conjunction with the drawings.

Figure 1:
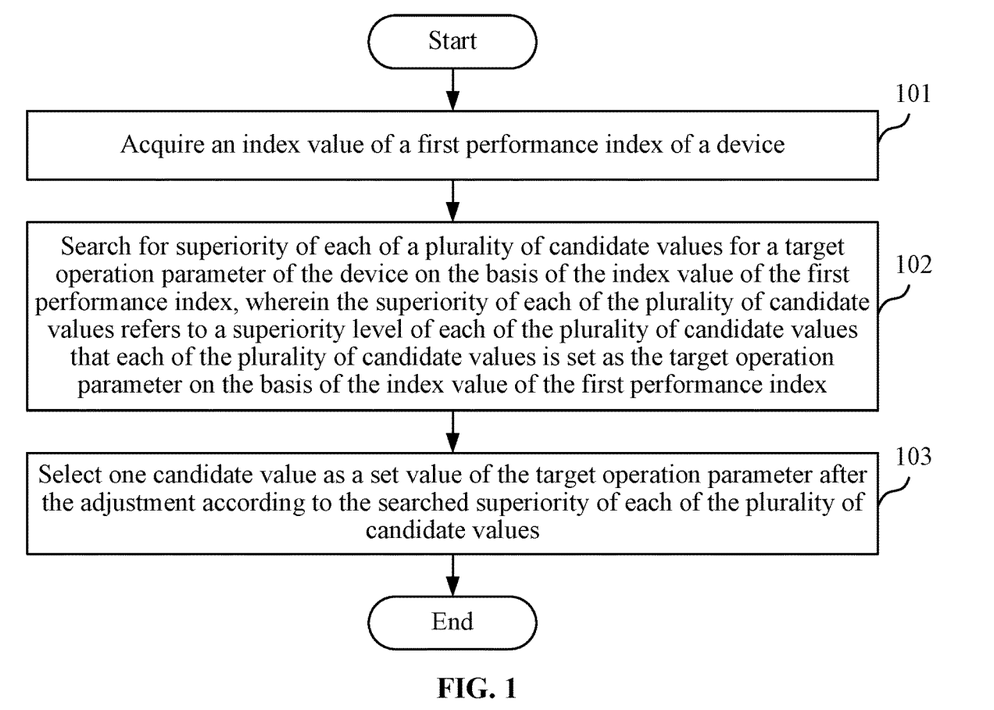
FIG. 1 is a flowchart of a parameter adjustment method according to a first embodiment of the present application.

A first embodiment of the present application relates to a parameter adjustment method. The method is applied to a device such as a base station. As shown in FIG. 1, the method includes 101, 102 and 103 described below.

In 101, an index value of a first performance index of a device is acquired.

The device automatically acquires the index value of the first performance index of the device within a latest preset time, and the preset time may be set as required, for example, the preset time is 15 minutes. The first performance index may be one type of performance index, for example, the first performance index is an uplink block error rate (BLER) $BLER^{current}$ of a cell, and an index value of $BLER^{current}$ is acquired. The first performance index may be several types of performance indexes, and the index values of the several types of performance indexes are acquired, for example, the first performance index is a resource block utilization rate, that is, a physical resource block (PRB) utilization rate, and a control channel element (CCE) utilization rate, and the index value of the PRB utilization rate and the index value of the CCE utilization rate are acquired, respectively.

In 102, the superiority of each of multiple candidate values for a target operation parameter of the device on the basis of the index value of the first performance index is searched for, where the superiority of each of the multiple candidate values refers to a superiority level of each of the multiple candidate values that each of the multiple candidate values is set as the target operation parameter on the basis of the index value of the first performance index.

The superiority may be represented by a numerical value or may be represented by multiple grades such as good or bad. The superiority is represented by a numerical value in various embodiments described below. The larger the numerical value is, the higher the superiority is. The representation of the superiority is not limited thereto. When the device initially operates, on the basis of index values of different first performance indexes, the initial values of superiority of multiple candidate values for the target operation parameter of the device may all be 0 or may be given different numerical values according to practical experience. Therefore, superiority of multiple candidate values for the target operation parameter of the device on the basis of index values of different first performance indexes may be different, and the superiority of each of the multiple candidate values for the target operation parameter of the device on the basis of the index value of the first performance index is required to be acquired. In one example, when the device is a base station, the first performance index is an uplink block error rate $BLER^{current}$ of a cell, and the target operation parameter is uplink transmit power P0. In one example, when the device is a base station, the first performance index is a resource block utilization rate of the cell, that is, a PRB utilization rate, and the target operation parameter is a parameter that characterizes the user migration management of the cell. For example, the parameter that characterizes the user migration management of the cell is three types of operations: Kick User, No Operation, and Absorb User. Kick User is to perform the operation of reducing a user connected to the cell, and Absorb User is to perform the operation of increasing a user connected to the cell. The base station may preset that the operation of Kick User or the operation of Absorb User is implemented through an inter-operation parameter, and at this point, such an implementation manner is as follows: the operation of Kick User is implemented by sending an instruction to a selected user to encourage the selected user to connect to another cell and the operation of Absorb User is implemented by sending an instruction to a selected user to encourage the selected user to connect to the current cell. The base station may also preset that the operation of Kick User or the operation of Absorb User is implemented by changing the transmit power of the cell, and at this point, such an implementation manner is that the operation of Kick User is implemented by reducing the transmit power of the cell and the operation of Absorb User is implemented by increasing the transmit power of the cell.

In the practical application of parameter adjustment, since the uplink block error rate of the cell affects the selection of the uplink transmit power, the setting that the first performance index is the uplink block error rate of the cell and the target operation parameter is the uplink transmit power meets the requirements of practical application; since the resource block utilization rate of the cell affects the selection of the parameter for user migration management of the cell, the setting that the first performance index is the resource block utilization rate of the cell and the target operation parameter is the parameter for user migration management of the cell meets the requirements of practical application.

In one example, the superiority of each candidate value for the target operation parameter of the device on the basis of the index value of the first performance index may be directly searched for according to the index value of the first performance index. For example, if the first performance index is one type of performance index, on the basis that the index value of the first performance index is a, the superiority of multiple candidate values for the target operation parameter of the device are 1, 3, and 4; on the basis that the index value of the first performance index is b, the superiority of multiple candidate values for the target operation parameter of the device are 2, 5, and 3; on the basis that the index value of the first performance index is c, the superiority of multiple candidate values for the target operation parameter of the device are 4, 5, and 2; and so on. When the acquired index value of the first performance index is a, the superiority of the multiple candidate values for the target operation parameter of the device on the basis that the index value of the first performance index is a are directly searched for, that is, the superiority are 1, 3, and 4. If the first performance index is two types of performance indexes M and N, on the basis that the index values of the first performance indexes M and N are a and b, respectively, the superiority of multiple candidate values for the target operation parameter of the device are 1, 3, and 4; on the basis that the index values of the first performance indexes M and N are b and c, respectively, the superiority of multiple candidate values for the target operation parameter of the device are 2, 5, and 3; on the basis that the index values of the first performance indexes M and N are c and d, respectively, the superiority of multiple candidate values for the target operation parameter of the device are 4, 5, and 2; and so on. When the acquired index values of the first performance indexes M and N are a and b, respectively, the superiority of the multiple candidate values for the target operation parameter of the device on the basis that the index values of the first performance indexes M and N are a and b are directly searched for, that is, the superiority are 1, 3, and 4.

Figure 2:
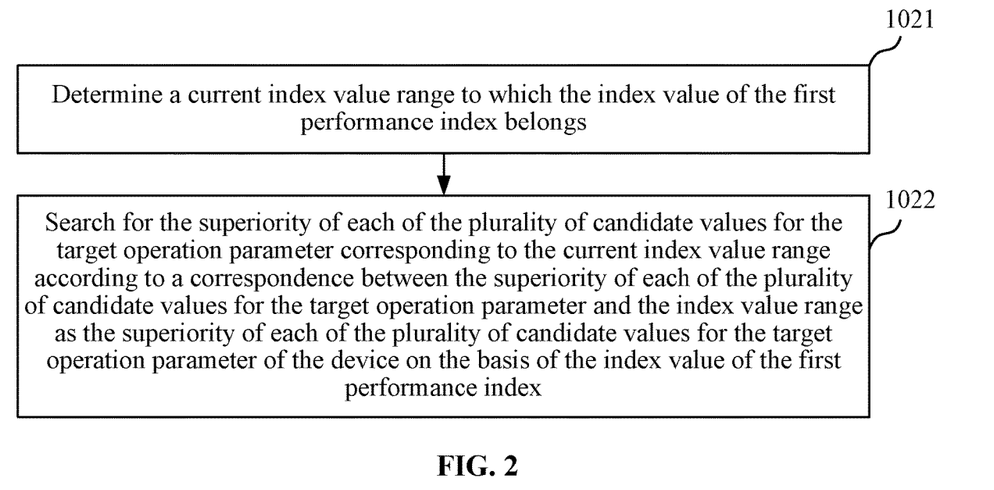
FIG. 2 is a flowchart of the implementation of 102 according to the first embodiment of the present application.

In one example, the flowchart in which the superiority of each of the multiple candidate values for the target operation parameter of the device on the basis of the index value of the first performance index is searched for is shown in FIG. 2 and includes 1021 and 1022 described below.

In 1021, a current index value range to which the index value of the first performance index belongs is determined.

In 1022, superiority of each of the multiple candidate values for the target operation parameter corresponding to the current index value range is searched for according to a correspondence between the superiority of each of the multiple candidate values for the target operation parameter and the index value range as the superiority of each of the multiple candidate values for the target operation parameter of the device on the basis of the index value of the first performance index.

When the correspondence between the superiority of each of the multiple candidate values for the target operation parameter and the index value range is preset in the device, the superiority of each of the multiple candidate values for the target operation parameter of the device on the basis of the index value of the first performance index can be easily and accurately determined through the method of this embodiment.

The device presets the correspondence between the superiority of each of the multiple candidate values for the target operation parameter and the index value range. The index value range may be a continuous range, such as 5%< $BLER^{current}$ ≤10% or may be a set consisting of numerical values, such as {5%, 6%, 7%, 8%}. In one example, when the first performance index is one type of performance index, the first performance index is $BLER^{current}$, the target operation parameter is P0, and multiple candidate values for P0 are −100 dBm, −94 dBm, −88 dBm, −82 dBm, and −76 dBm. The correspondence between the superiority of each of the multiple candidate values for the target operation parameter and the index value range is shown in Table 1.

TABLE 1

|  | P0 −100 dBm | P0 −94 dBm | P0 −88 dBm | P0 −82 dBm | P0 −76 dBm |
|---|---|---|---|---|---|
| $BLER^{current} \leq 5\%$ | 1 | 2 | 2 | 4 | 6 |
| $5\% < BLER^{current} \leq 10\%$ | 0 | 3 | 5 | 8 | 4 |
| $10\% < BLER^{current} \leq 15\%$ | 1 | 8 | 4 | 6 | 2 |
| $15\% < BLER^{current} \leq 25\%$ | 4 | 2 | 5 | 8 | 9 |
| $BLER^{current} > 25\%$ | 6 | 3 | 2 | 5 | 1 |

If the index value of $BLER^{current}$ is 11%, the current index value range to which the index value of $BLER^{current}$ belongs is $10\% < BLER^{current} \leq 15\%$, and the superiority of the multiple candidate values for the target operation parameter corresponding to the current index value range are searched for according to the correspondence between the superiority of each of the multiple candidate values for the target operation parameter and the index value range in Table 1, that is, the superiority are 1, 8, 4, 6, and 2.

In one example, when the first performance index is one type of performance index, the first performance index is the PRB utilization rate, the target operation parameter is the parameter that characterizes the user migration management of the cell, and multiple candidate values of the parameter that characterizes the user migration management of the cell are three operations, that is, Kick User, No Operation, and Absorb User. The correspondence between the superiority of candidate values of the three operations for the target operation parameter and the index value ranges is shown in Table 2, where the index value ranges are represented in the form of states in Table 2. In fact, various ranges of the PRB utilization rate are stored in a computer, for example, the PRB utilization rate is [0%, 30%), the PRB utilization rate is [30%, 60%), the PRB utilization rate is [60%, 80%), and the PRB utilization rate is [80%, 100%]. According to practical experience, when the PRB utilization rate is [0%, 30%), the device may be considered to be in an idle state; when the PRB utilization rate is [30%, 60%), the device may be considered to be in a relatively idle state; when the PRB utilization rate is [60%, 80%), the device may be considered to be in a relatively busy state; when the PRB utilization rate is [80%, 100%], the device may be considered to be in a busy state.

TABLE 2

|  | Kick User | No Operation | Absorb User |
|---|---|---|---|
| Idle | 3 | 0 | 2 |
| Relatively idle | 1 | 3 | 5 |
| Relatively busy | 4 | 3 | 1 |
| Busy | 6 | 2 | 2 |

If the index value of the PRB utilization rate is 40%, the current index value range to which the index value of the PRB utilization rate belongs is [30%, 60%), indicating that the device is in a relatively idle state, as shown in Table 2, and the superiority of the multiple candidate values for the target operation parameter corresponding to the current index value range are searched for according to the correspondence between the superiority of each of the multiple candidate values for the target operation parameter and the index value range in Table 2, that is, the superiority are 1, 3, and 5.

In one example, when the first performance index is two types of performance indexes, the first performance indexes are the PRB utilization rate and the CCE utilization rate, the target operation parameter is the parameter that characterizes the user migration management of the cell, and multiple candidate values for the parameter that characterizes the user migration management of the cell are three operations, that is, Kick User, No Operation, and Absorb User. The correspondence between the superiority of candidate values of the three operations for the target operation parameter and the index value ranges is shown in Table 3, where the index value ranges are represented in the form of states in Table 3. In fact, various ranges of the PRB utilization rate and the CCR utilization rate are stored in the computer, for example, the PRB utilization rate and the CCE utilization rate are [0%, 40%) and [0%, 50%), respectively, the PRB utilization rate and the CCE utilization rate are [0%, 40%) and [50%, 100%), respectively, the PRB utilization rate and the CCE utilization rate are [40%, 100%) and [0%, 50%), respectively, and the PRB utilization rate and the CCE utilization rate are [40%, 100%) and [50%, 100%), respectively. According to practical experience, when the PRB utilization rate and the CCE utilization rate are [0%, 40%) and [0%, 50%), respectively, the device may be considered to be in an idle state; when the PRB utilization rate and the CCE utilization rate are [0%, 40%) and [50%, 100%), respectively, the device may be considered to be in a relatively idle state; when the PRB utilization rate and the CCE utilization rate are [40%, 100%) and [0%, 50%), respectively, the device may be considered to be in a relatively busy state; when the PRB utilization rate and the CCE utilization rate are [40%, 100%) and [50%, 100%), respectively, the device may be considered to be in a busy state.

TABLE 3

|  | Kick User | No Operation | Absorb User |
|---|---|---|---|
| Idle | 3 | 0 | 2 |
| Relatively idle | 1 | 3 | 5 |
| Relatively busy | 4 | 3 | 1 |
| Busy | 6 | 2 | 2 |

If the index value of the PRB utilization rate is 30% and the CCE utilization rate is 20%, the current index value ranges to which the PRB utilization rate and the CCE utilization rate belong respectively are [0%, 40%) and [0%, 50%), the device is in an idle state as reflected in Table 3, and the superiority of candidate values for the target operation parameter corresponding to the current index value ranges are searched for according to the correspondence between the superiority of each candidate value for the target operation parameter and the index value range in Table 3, that is, the superiority are 3, 0, and 2.

In 103, one candidate value is selected as a set value of the target operation parameter after the adjustment according to the searched superiority of each of the multiple candidate values.

In one example, the operation that one candidate value is selected according to the searched superiority of each of the multiple candidate values includes one of the following: selecting the candidate value with the highest superiority is directly on the basis of the searched superiority of each of the multiple candidate values, or any one of the two candidate values with the highest superiority on the basis of the superiority of each of the multiple candidate values, and so on.

Figure 3:
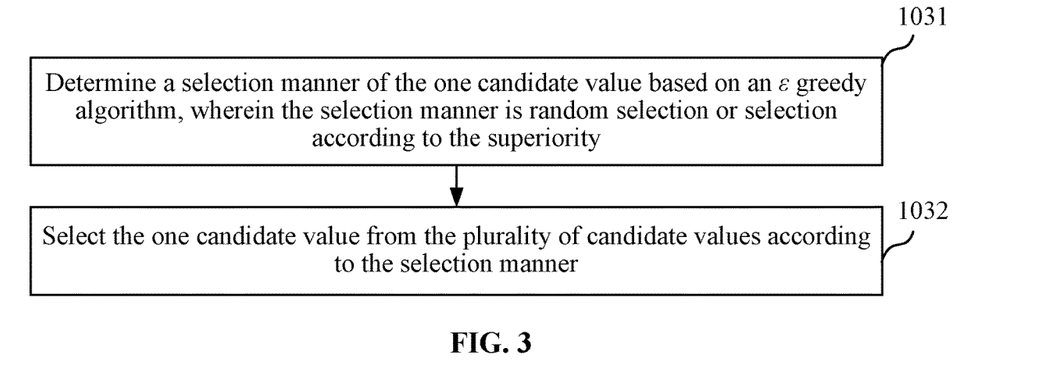
FIG. 3 is a flowchart of the implementation of 103 according to the first embodiment of the present application.

In one example, the flowchart in which the one candidate value is selected according to the superiority of each of the multiple candidate values for the target operation parameter of the device on the basis of the index value of the first performance index is shown in FIG. 3 and includes 1031 and 1032.

In 1031, a selection manner of the one candidate value is determined based on an E greedy algorithm; where the selection manner is random selection or selection according to the superiority.

One random number x is generated, where $0 \leq x \leq 1$. If x is less than ε, the selection manner of the one candidate value is determined as random selection; if x is not less than ε, the selection manner of the one candidate value is determined as selection according to the superiority; where $\varepsilon=1/\sqrt{T}$, the parameter adjustment method is executed periodically, and T is the current number of execution times. For example, T=255, ε=0.067, if x is 0.02, the selection manner is random selection, and if x is 0.08, the selection manner is selection according to the superiority.

In 1032, the one candidate value is selected from the multiple candidate values according to the selection manner.

In one example, if the selection manner is selection according to the superiority, the candidate value with the highest superiority is selected from the candidate values. For example, in the current state, the superiority of the multiple candidate values for the target operation parameter of the device are 1, 8, 4, 6, and 2, respectively, and the candidate value whose superiority is 8 is selected. If the selection manner is random selection, any candidate value is selected.

The selection manner of the one candidate value can be accurately determined based on the E greedy algorithm, and the one candidate value is selected according to different selection manners, thereby selecting the appropriate candidate value more accurately.

In this embodiment, the index value of the first performance index of the device is acquired, the superiority of each of the multiple candidate values for the target operation parameter of the device on the basis of the index value of the first performance index is searched for, and one candidate value is selected as the set value of the target operation parameter after the adjustment according to the searched superiority of each of the multiple candidate values. Since the candidate value selected according to the superiority is more accurate, the set value of the adjusted target operation parameter is more accurate, thereby achieving the object of automatically adjusting a parameter to obtain the parameter with higher accuracy.

Figure 4:
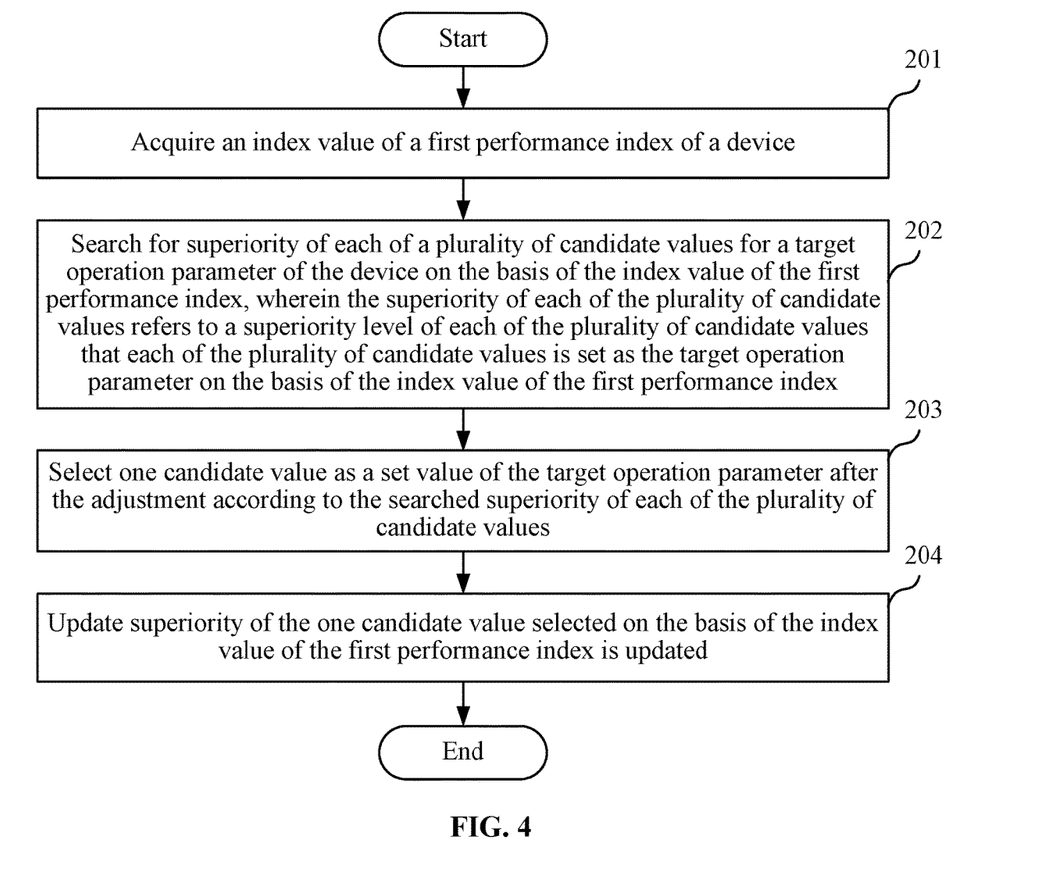
FIG. 4 is another flowchart of a parameter adjustment method according to a second embodiment of the present application.

The second embodiment of the present application relates to a parameter adjustment method. The second embodiment is approximately the same as the first embodiment, and the main difference between the second embodiment and the first embodiment is that the superiority of each candidate value for the target operation parameter of the device in different states is continuously updated. As shown in FIG. 4, the method provided in the second embodiment includes 201, 202, 203, and 204 described below.

In 201, an index value of a first performance index of a device is acquired.

In 202, the superiority of each of multiple candidate values for a target operation parameter of the device on the basis of the index value of the first performance index is searched for, where the superiority of each of the multiple candidate values refers to a superiority level of each of the multiple candidate values that each of the multiple candidate values is set as the target operation parameter on the basis of the index value of the first performance index.

In 203, one candidate value is selected as a set value of the target operation parameter after the adjustment according to the searched superiority of each of the multiple candidate values.

201 to 203 are similar to 101 to 103, and details will not be repeated herein.

In 204, superiority of the one candidate value selected on the basis of the index value of the first performance index is updated.

In one example, an adjustment value of the superiority may be preset, the adjustment value of the superiority and the original superiority are added to obtain a new superiority, and the new superiority is updated as the superiority of the one candidate value selected on the basis of the index value of the first performance index. For example, the preset adjustment value of the superiority is 2, the original superiority is 3, the new superiority is 5, and the new superiority 5 is updated as the superiority of the one candidate value selected on the basis of the index value of the first performance index.

In one example, the new superiority may also be preset, and the new superiority is directly updated as the superiority of the one candidate value selected on the basis of the index value of the first performance index. For example, the preset new superiority is 5, and the new superiority 5 is directly updated as the superiority of the one candidate value selected on the basis of the index value of the first performance index.

In this embodiment, the superiority of each candidate value for the target operation parameter of the device on the basis of index values of different first performance indexes is continuously updated so that the superiority is more accurate, and each time one candidate value is selected as the set value of the target operation parameter after the adjustment, the selection is performed based on the recently updated superiority, thereby improving the accuracy of the automatically adjusted parameter.

Figure 5:
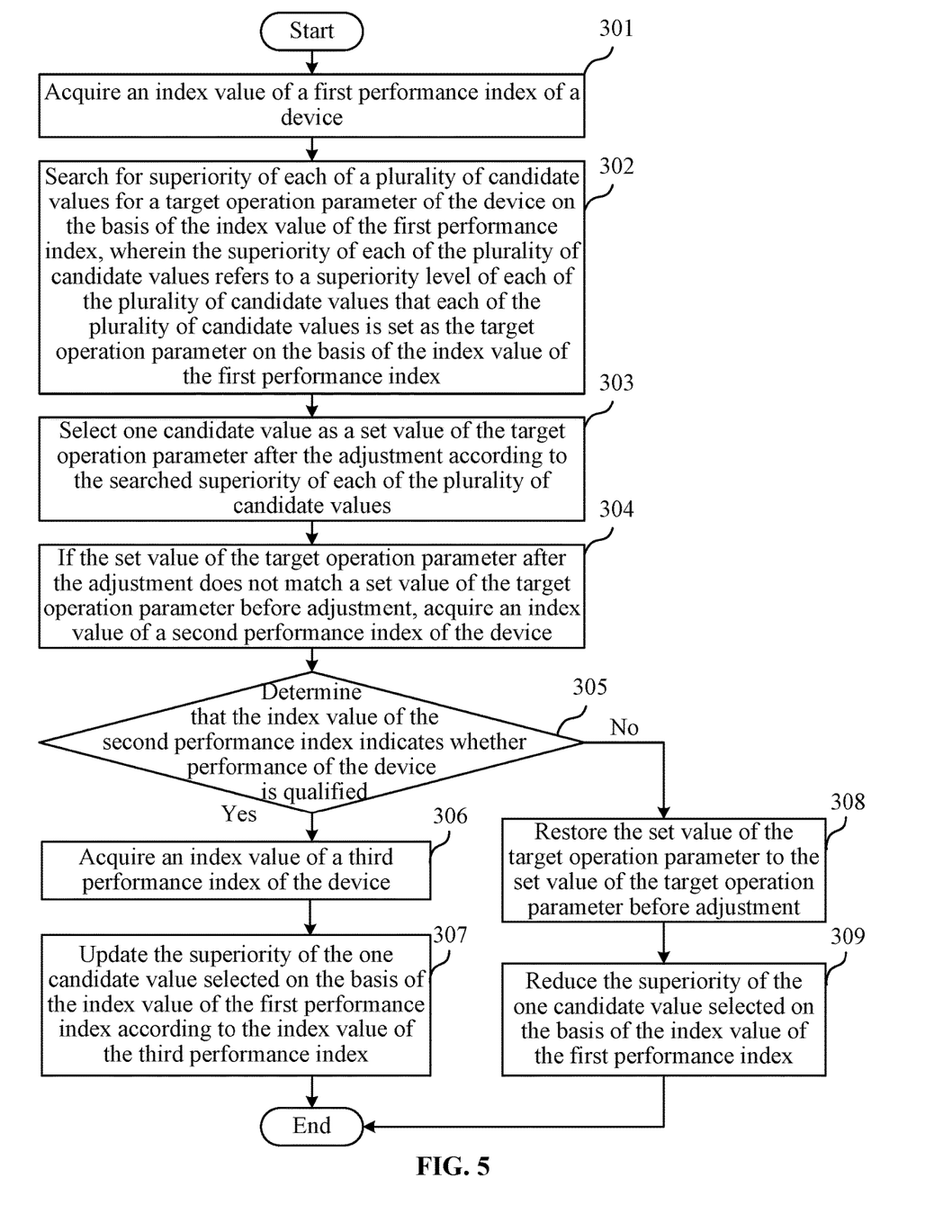
FIG. 5 is another flowchart of a parameter adjustment method according to a third embodiment of the present application.

The third embodiment of the present application relates to a parameter adjustment method. The third embodiment is approximately the same as the second embodiment, and the main difference between the third embodiment and the second embodiment is that if the set value of the target operation parameter after the adjustment does not match a set value of the target operation parameter before adjustment, whether the operation of the device based on the set value of the target operation parameter after the adjustment is available is required to be evaluated according to the index value of a second performance index before corresponding operations are performed. As shown in FIG. 5, the method includes 301 to 309 described below.

In 301, an index value of a first performance index of a device is acquired.

In 302, the superiority of each of multiple candidate values for a target operation parameter of the device on the basis of the index value of the first performance index is searched for, where the superiority of each of the multiple candidate values refers to a superiority level of each of the multiple candidate values that each of the multiple candidate values is set as the target operation parameter on the basis of the index value of the first performance index.

In 303, one candidate value is selected as a set value of the target operation parameter after the adjustment according to the searched superiority of each of the multiple candidate values.

301 to 303 are similar to 101 to 103, and details will not be repeated herein.

In 304, if the set value of the target operation parameter after the adjustment does not match a set value of the target operation parameter before adjustment, an index value of a second performance index of the device is acquired.

When the set value of the target operation parameter after the adjustment does not match the set value of the target operation parameter before adjustment, it is indicated that the two set values do not match, and the index value of the second performance index of the device is acquired; when the set value of the target operation parameter after the adjustment matches the set value of the target operation parameter before adjustment, it is indicated that the two set values match. If the first-round parameter adjustment is performed, an initial value is preset for the set value of the target operation parameter, and the set value of the target operation parameter before adjustment in the first-round adjustment is the initial value. The second performance index includes, but is not limited to, one or any combination of the following: a radio resource control (RRC) connection setup success rate, an evolved radio access bearer (ERAB) setup success rate of a user plane, a radio completion rate, a handover success rate, a radio drop rate, and an ERAB drop rate.

In 305, that the index value of the second performance index indicates whether performance of the device is qualified is determined; if the index value of the second performance index indicates that the performance of the device is qualified, 306 is performed, and then 307 is performed; if the index value of the second performance index indicates that the performance of the device is not qualified, 308 is performed, and then 309 is performed.

The index values of the second performance index are compared with respective preset thresholds according to the types. If a preset number of index values are less than respective preset thresholds, it indicates that the performance of the device is not qualified; if a preset number of index values are not less than respective preset thresholds, it indicates that the performance of the device is qualified; where the preset number may be set according to actual requirements. For example, if the index values of the second performance index include an RRC connection setup success rate of 50%, an ERAB setup success rate of 70%, a radio connection rate of 65%, and a handover success rate of 66% and the respective preset thresholds are 60%, 65%, 60%, and 55%, when the preset number is 1, there is one index value that is less than the respective preset threshold, indicating that the performance of the device is not qualified.

In one example, when the determination results exceeding a preset number of times are all that the performance of the device is not qualified, the superiority of each of multiple candidate values for the target operation parameter of the device in different states is restored to the initial value, where the preset number of times may be set according to actual requirements and is not limited to this embodiment.

In 306, an index value of a third performance index of the device is acquired.

In 307, the superiority of the one candidate value selected on the basis of the index value of the first performance index is updated according to the index value of the third performance index.

In one example, the operation that the superiority of the one candidate value selected on the basis of the index value of the first performance index is updated according to the index value of the third performance index includes the following: an adjustment value of the superiority is acquired according to the index value of the third performance index, and the superiority of the one candidate value selected on the basis of the index value of the first performance index is updated according to the adjustment value of the superiority. The adjustment value of the superiority obtained according to the index value of the third performance index is more accurate, and the superiority is updated according to the adjustment value of the superiority so that the updated superiority is more accurate. The index value of the third performance index corresponds to different preset adjustment values of the superiority; or the third performance index is brought into a preset calculation formula to calculate an adjustment value of the superiority, the adjustment value of the superiority is added to the original superiority to obtain a new superiority, and the new superiority is updated as the superiority of the candidate value selected in the current state. For example, when the index value of the third performance index is 5%, the adjustment value of the corresponding superiority is 2, and when the index value of the third performance index is 10%, the adjustment value of the corresponding superiority is 3.

In one example, the first performance index and the second performance index are performance indexes of a current cell, and the third performance index includes performance indexes of the same type of the current cell and an intra-frequency neighboring cell, where the device is a base station. When the superiority of the one candidate value selected on the basis of the index value of the first performance index is updated, both the index value of the performance index of the cell and the index value of the performance index of the intra-frequency neighboring cell are considered, thereby improving the accuracy of the updated superiority. For example, the first performance index is an uplink block error rate $BLER^{current}$ of the current cell, the second performance index is an ERAB drop rate of the current cell, and the third performance index includes a re-acquired total traffic $Payload^{current}$ of the current cell and a total traffic $Payload^{neighbor}$ of the intra-frequency neighboring cell. In one example, the third performance index and the first performance index are performance indexes of the same type. For example, the first performance index is $BLER^{current}$, and the third performance index is a re-acquired uplink block error rate $BLER^{current}$ of the current cell within the latest preset duration and a re-acquired uplink block error rate BLER neighbor of the intra-frequency neighboring cell within the latest preset duration.

In 308, the set value of the target operation parameter is restored to the set value of the target operation parameter before adjustment.

If the set value of the target operation parameter P0 before adjustment is −88 dBm and the set value of the target operation parameter after the adjustment is −94 dBm, the set value of the target operation parameter P0 is restored to −88 dBm.

In 309, the superiority of the one candidate value selected on the basis of the index value of the first performance index is reduced.

In one example, the operation that the superiority of the one candidate value selected on the basis of the index value of the first performance index is reduced includes the following: the superiority of the one candidate value selected on the basis of the index value of the first performance index is reduced according to a preset adjustment value of the superiority. In a case where the set value of the target operation parameter is restored to the set value of the target operation parameter before adjustment, the superiority is directly reduced according to the preset adjustment value of the superiority, thereby improving the update efficiency. The preset adjustment value of the superiority may be set according to actual requirements and is not limited to this embodiment. If the preset adjustment value of the superiority is a positive value, a new superiority is obtained by subtracting the preset adjustment value of the superiority from the original superiority, and the new superiority is updated as the superiority of the candidate value selected in the current state. For example, if the original superiority is 5 and the preset adjustment value of the superiority is 1, the new superiority is 4, and the new superiority is updated as the superiority of the candidate value selected in the current state. If the preset adjustment value of the superiority is a negative value, the preset adjustment value of the superiority is added to the original superiority to obtain a new superiority, and the new superiority is updated as the superiority of the candidate value selected in the current state. For example, if the original superiority is 5 and the preset adjustment value of the superiority is −1, the new superiority is 4, and the new superiority 4 is updated as the superiority of the one candidate value selected on the basis of the index value of the first performance index.

The following will be described in conjunction with two examples.

In a first example, the device is a base station. The first performance index is the uplink block error rate $BLER^{current}$ of the current cell, where $BLER^{current}$ is acquired within the latest preset duration, and the preset duration is 15 min. The initialization target uplink $BLER^{target\ value}$. The target operation parameter is P0, the candidate values for P0 are −100 dBm, −94 dBm, −88 dBm, −82 dBm and −76 dBm, and the initial set value of P0 is −88 dBm. The correspondence between the index value range and the superiority of each candidate value for the target operation parameter is shown in Table 4 below, the initial values of the superiority of multiple candidate values for the target operation parameter of the device on the basis of the index value of the first performance index are 0, and the values in Table 4 are the superiority.

TABLE 4

| | P0 −100 dBm | P0 −94 dBm | P0 −88 dBm | P0 −82 dBm | P0 −76 dBm |
|---|---|---|---|---|---|
| $BLER^{current} \leq 5\%$ | 0 | 0 | 0 | 0 | 0 |
| $5\% < BLER^{current} \leq 10\%$ | 0 | 0 | 0 | 0 | 0 |
| $10\% < BLER^{current} \leq 15\%$ | 0 | 0 | 0 | 0 | 0 |
| $15\% < BLER^{current} \leq 25\%$ | 0 | 0 | 0 | 0 | 0 |
| $BLER^{current} > 25\%$ | 0 | 0 | 0 | 0 | 0 |

The following is described in conjunction with the current number T of execution times being 256. The correspondence between the index value range and the superiority of each candidate value for the target operation parameter is shown in Table 5 below, and the values in Table 5 are the updated superiority.

TABLE 5

| | P0 −100 dBm | P0 −94 dBm | P0 −88 dBm | P0 −82 dBm | P0 −76 dBm |
|---|---|---|---|---|---|
| $BLER^{current} \leq 5\%$ | 1 | 2 | 2 | 4 | 6 |
| $5\% < BLER^{current} \leq 10\%$ | 0 | 3 | 5 | 8 | 4 |
| $10\% < BLER^{current} \leq 15\%$ | 1 | 8 | 4 | 6 | 2 |
| $15\% < BLER^{current} \leq 25\%$ | 4 | 2 | 5 | 8 | 9 |
| $BLER^{current} > 25\%$ | 6 | 3 | 2 | 5 | 1 |

In Step 1, according to the index value of $BLER_T^{current}$ acquired within the latest 15 minutes the current index value range to which the index value of $BLER_T^{current}$ belongs is determined, and if the acquired index value of $BLER_T^{current}$ is 11%, the current index value range to which the index value of $BLER_T^{current}$ belongs is determined to be in the state of $10\% < BLER^{current} \leq 15\%$ and is in the third row in Table 5.

In Step 2, the superiority of the multiple candidate values for the target operation parameter corresponding to the current index value range $10\% < BLER^{current} \leq 15\%$ are searched for, that is, the superiority are 1, 8, 4, 6, and 2, respectively; the selection manner of the candidate value is determined according to an ε greedy algorithm, and if the generated random number x is 0.08, T=256 and ε=1/√T=0.067, since x is not less than ε, the selection method is selection according to the superiority; the candidate value with the highest superiority is selected from the candidate values for the target operation parameter. The candidate value whose superiority is 8 is selected, that is, P0 is −94 dBm, and the set value of the target operation parameter after the adjustment is −94 dBm.

If the set value of the target operation parameter P0 before adjustment is −88 dBm, the set value of the target operation parameter after the adjustment is not consistent with the set value of the target operation parameter before adjustment, indicating that the two set values do not match, and then directly go to Step 3.

If the set value of the target operation parameter P0 before adjustment is −94 dBm, the set value of the target operation parameter after the adjustment is consistent with the set value of the target operation parameter before adjustment, indicating that the two set values match, and then directly go to Step 4.

In Step 3, after the base station operates for 10 s on the basis that P0 is −94 dBm, the index value of a second performance index of the device is acquired. If the RRC connection setup success rate is 68%, the ERAB setup success rate is 70%, the radio connection rate is 65%, the handover success rate is 66% and the respective preset thresholds are 60%, 65%, 60%, and 55%, all the index values are greater than the respective preset thresholds, indicating that the performance of the device is qualified, and then go to Step 4.

If the RRC connection setup success rate is 50%, the ERAB setup success rate is 70%, the radio connection rate is 65%, the handover success rate is 66% and the respective preset thresholds are 60%, 65%, 60%, and 55%, one index value is less than the respective preset threshold, indicating that the performance of the device is not qualified. The set value of the target operation parameter is restored to the set value of the target operation parameter before adjustment, that is, the set value of the target operation parameter is restored to −88 dBm, and the base station operates on the basis that P0 is −88 dBm. The preset adjustment value which is −1 of the superiority and the original superiority which is 8 are added to obtain a new superiority which is 7, the superiority 7 covers 8 in Table 5, and then go to Step 1 again.

In Step 4, an adjustment value of the superiority is calculated according to the following formula:

$$R = \left|BLER_T^{current} - BLER^{target\ value}\right| - \left|BLER_{T+1}^{current} - BLER^{target\ value}\right| + \frac{\beta}{N}\sum_{n=1}^{N}\left(\left|BLER_T^{neighbor,n} - BLER^{target\ value}\right| - \left|BLER_{T+1}^{neighbor,n} - BLER^{target\ value}\right|\right).$$

In the above formula, R is the adjustment value of the superiority, $\beta$ is the preset initial neighboring cell weight value, N is the number of intra-frequency neighboring cells, $BLER_T^{current}$ is the uplink block error rate of the current cell acquired within the latest 15 minutes, $BLER_{T+1}^{current}$ the uplink block error rate of the current cell acquired within the next 15 minutes, $BLER^{target\ value}$ is the initialization target uplink block error rate, $BLER_T^{neighbor,n}$ is the uplink block error rate of the intra-frequency neighboring cell acquired within the latest 15 minutes, where n is the index value, and $BLER_{T+1}^{neighbor,n}$ is the uplink block error rate of the intra-frequency neighboring cell acquired within the next 15 minutes, where n is the index value. If the calculated R is 1, the value 1 of R is added to the original superiority which is 8 to obtain a new superiority which is 9, the superiority 9 covers 8 in Table 5, and then go to Step 1 again.

In a second example, the device is a base station. The first performance index is a PRB utilization rate, where the PRB utilization rate is acquired within the latest preset duration, and the preset duration is 15 min. The target operation parameter is a parameter that characterizes the user migration management of the cell, that is, Kick User, Absorb User, and No Operation. The initial set value of the target operation parameter is No Operation. Different operations are implemented by changing the transmit power of the cell, the operation of Kick User is implemented by reducing the transmit power of the cell, the operation of Absorb User is implemented by increasing the transmit power of the cell, and the operation of No Operation is implemented by keeping the transmit power of the cell unchanged, where the amplitude of the change is 5 dBm. The index value ranges are represented in the form of states in Table 6 and Table 7. According to practical experience, when the PRB utilization rate is [0%, 30%), the device may be considered to be in an idle state; when the PRB utilization rate is [30%, 60%), the device may be considered to be in a relatively idle state; when the PRB utilization rate is [60%, 80%), the device may be considered to be in a relatively busy state; when the PRB utilization rate is [80%, 100%], the device may be considered to be in a busy state. The correspondence between the index value range and the superiority of each candidate value for the target operation parameter is shown in Table 6 below, the initial values of the superiority of multiple candidate values for the target operation parameter of the device on the basis of the index value of the first performance index are 0, and the values in Table 6 are the superiority.

TABLE 6

|   | a = Kick User | a = No Operation | a = Absorb User |
|---|---|---|---|
| s = idle | 0 | 0 | 0 |
| s = relatively idle | 0 | 0 | 0 |
| s = relatively busy | 0 | 0 | 0 |
| s = busy | 0 | 0 | 0 |

The following is described in conjunction with the current number T of execution times being 256. The correspondence between the index value range and the superiority of each candidate value for the target operation parameter is shown in Table 7 below, and the values in Table 7 are the updated superiority.

TABLE 7

|   | Kick User | No Operation | Absorb User |
|---|---|---|---|
| Idle | 3 | 0 | 2 |
| Relatively idle | 1 | 3 | 5 |
| Relatively busy | 4 | 3 | 1 |
| Busy | 6 | 2 | 2 |

In Step 1, according to the index value of the PRB utilization rate acquired within the latest 15 minutes, the current index value range to which the index value of the PRB utilization rate belongs is determined, and if the acquired index value of the PRB utilization rate is 70%, the current index value range to which the index value of the PRB utilization rate belongs is [60%, 80%), that is, the device is in a relatively busy state, and is in the third row in Table 7.

In Step 2, the superiority of the multiple candidate values for the target operation parameter of the device which is in a relatively busy state are searched for, that is, the superiority are 4, 3, and 1, respectively; the selection manner of the candidate value is determined according to an $\varepsilon$ greedy algorithm, and if the generated random number x is 0.08, T=256 and $\varepsilon=1/\sqrt{T}=0.067$, since x is not less than $\varepsilon$, the selection method is selection according to the superiority; the candidate value with the highest superiority is selected from the candidate values for the target operation parameter. The candidate value whose superiority is 4 is selected, that is, Kick User is selected, and the set value of the target operation parameter after the adjustment is Kick User. If the transmit power of the current cell is 35 dBm, the transmit power of the cell is adjusted to 30 dBm, and the base station operates on the basis that the transmit power of the cell is 30 dBm.

If the set value of the target operation parameter before adjustment is No Operation, the set value of the target operation parameter after the adjustment is not consistent with the set value of the target operation parameter before adjustment, indicating that the two set values do not match, and then directly go to Step 3.

If the set value of the target operation parameter before adjustment is Kick User, the set value of the target operation parameter after the adjustment is consistent with the set value of the target operation parameter before adjustment, indicating that the two set values match, and then directly go to Step 4.

In Step 3, after the base station operates for 10 s on the basis that the transmit power of the cell is 30 dBm, the index value of a second performance index of the device is acquired. If the RRC connection setup success rate is 68%, the ERAB setup success rate is 70%, the radio connection rate is 65%, the handover success rate is 66% and the respective preset thresholds are 60%, 65%, 60%, and 55%, all the index values are greater than the respective preset thresholds, indicating that the performance of the device is qualified, and then go to Step 4.

If the RRC connection setup success rate is 50%, the ERAB setup success rate is 70%, the radio connection rate is 65%, the handover success rate is 66% and the respective preset thresholds are 60%, 65%, 60%, and 55%, one index value is less than the respective preset threshold, indicating that the performance of the device is not qualified. The set value of the target operation parameter is restored to the set value of the target operation parameter before adjustment, that is, the set value of the target operation parameter is restored to No Operation, and the base station operates on the basis that the transmit power of the cell is 35 dBm. The preset adjustment value which is −1 of the superiority and the original superiority which is 4 are added to obtain a new superiority which is 3, the superiority 3 covers 4 in Table 7, and then go to Step 1 again.

In Step 4, an adjustment value of the superiority is calculated according to the following formulas:

$$R = \min\left(\frac{\text{Payload}_{T+1}^{current}}{\text{Payload}_T^{current}} - 1, 1\right) + \min\left(\frac{\sum_{n=1}^{N} \text{Payload}_{T+1}^{neighbor,n}}{\sum_{n=1}^{N} \text{Payload}_T^{neighbor,n}} - 1, 1\right), \text{ and,} \quad \text{Formula 1}$$

$$Q_T^{s,a} = Q_T^{s,a} + \alpha(R + \gamma \max Q_{T+1}^{s',a'} - Q_T^{s,a}). \quad \text{Formula 2}$$

In the above formulas, $Q_T^{s,a}$ is the adjustment value of the superiority, $\text{Payload}_T^{current}$ is the total traffic of the current cell acquired within the latest 15 minutes, $\text{Payload}_{T+1}^{current}$ is the total traffic of the current cell acquired within the next 15 minutes, $\text{Payload}_T^{neighbor,n}$ is the total traffic of the intra-frequency neighboring cell acquired within the latest 15 minutes, where n is the index value, $\text{Payload}_{T+1}^{neighbor,n}$ neighbor,n is the total traffic of the intra-frequency neighboring cell acquired within the next 15 minutes, where n is the index value, $\max_{T+1}^{s'a'}$ is the maximum value among the superiority of the multiple candidate values for the target operation parameter of the device in the current state within the next 15 minutes, the initialization learning rate equals 0.1, and the discount rate γ equals 0.9.

If the calculated adjustment value $Q_T^{s,a}$ of the superiority is 2, the value of $Q_T^{s,a}$ which is 2 and the original superiority which is 4 are added to obtain a new superiority which is 6, the superiority 6 covers 4 in Table 7, and then go to Step 1 again.

In this embodiment, when the index value of the second performance index indicates that the performance of the device is qualified, indicating that the device can operate on the basis of the set value of the target operation parameter after the adjustment, the device continues to operate based on the set value of the target operation parameter after the adjustment, and the superiority of the candidate value selected in this state is updated according to the acquired index value of the third performance index so that the updated superiority is more accurate. When the index value of the second performance index indicates that the performance of the device is not qualified, indicating that the device cannot operate on the basis of the set value of the target operation parameter after the adjustment, the set value of the target operation parameter is restored to the set value of the target operation parameter before adjustment to enable the device to operate based on the set value of the target operation parameter before adjustment and enable the device to maintain the original operation state, and at this point, the superiority of the candidate value selected on the basis of the index value of the first performance index is required to be reduced so that the updated superiority is more accurate.

Figure 6:
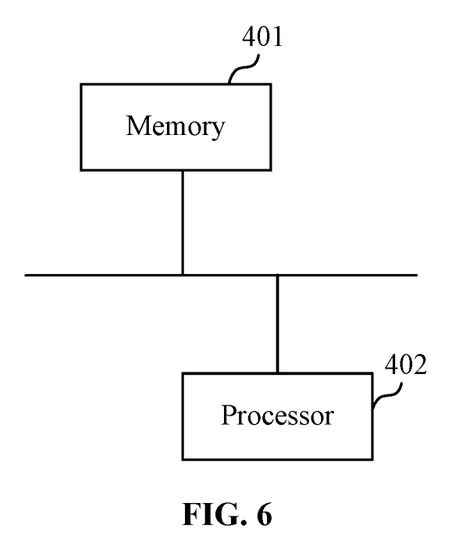
FIG. 6 is a structure diagram of a server according to a fourth embodiment of the present application.

A fourth embodiment of the present application relates to a server. As shown in FIG. 6, the server includes at least one processor 402 and a memory 401 communicatively connected to the at least one processor 402, where the memory 401 stores instructions executable by the at least one processor 402, and the instructions are executed by the at least one processor 402 to enable the at least one processor 402 to perform the embodiments of the parameter adjustment method.

The memory 401 and the processor 402 are connected via a bus. The bus may include any number of interconnected buses and bridges, and various circuits including one or more processors 402 and the memory 401 are all connected together via the bus. The bus may also connect various other circuits such as peripheral devices, voltage regulators, power management circuits, and the like, and details will not be repeated herein. The bus interface provides an interface between the bus and a transceiver. The transceiver may be one element, or may be multiple elements, such as multiple receivers and a sender, and the transceiver provide an element for communicating with various other apparatus or devices over a transmission medium. The data processed by the processor 402 is transmitted over a radio medium through an antenna, and the antenna also receives data and transmits the data to the processor 402.

The processor 402 is responsible for managing the bus and general processing, and may also provide a variety of functions, including timing, peripheral interfaces, voltage regulation, power management, and other control functions. The memory 401 may be configured to store the data used by the processor 402 for performing operations.

A fifth embodiment of the present application relates to a non-transitory computer-readable storage medium storing a computer program. The computer program, when executed by a processor, performs the preceding method embodiments.

All or part of the steps in the preceding method embodiments may be implemented by related hardware as instructed by a program. The preceding program may be stored in a storage medium and contains multiple instructions to enable a device (which may be a single-chip microcomputer, a chip, and the like) or a processor to perform all or part of the steps of the method in a plurality of embodiments of the present application. The preceding storage medium includes a USB flash disk, a mobile hard disk, a read-only memory (ROM), a random-access memory (RAM), a magnetic disk, an optical disk or another medium that can store program codes.

What is claimed is:

1. A parameter adjustment method, comprising:
  acquiring an index value of a first performance index of a device;
  searching for superiority of each of a plurality of candidate values for a target operation parameter of the device on the basis of the index value of the first performance index, wherein superiority of a candidate value of the plurality of candidate values refers to a superiority degree when the candidate value of the plurality of candidate values is set as the target operation parameter on the basis of the index value of the first performance index; and
  selecting one candidate value as a set value of the target operation parameter after an adjustment according to the searched superiority of each of the plurality of candidate values,
  wherein after selecting one candidate value as the set value of the target operation parameter after the adjustment according to the searched superiority of each of the plurality of candidate values, the method further comprises:
  updating superiority of the one candidate value selected on the basis of the index value of the first performance index.

2. The method of claim 1, wherein searching for the superiority of each of the plurality of candidate values for the target operation parameter of the device on the basis of the index value of the first performance index comprises:
- determining a current index value range to which the index value of the first performance index belongs; and
- searching for, according to a correspondence between the superiority of each of the plurality of candidate values for the target operation parameter and the index value range, superiority of each of the plurality of candidate values for the target operation parameter corresponding to the current index value range as the superiority of each of the plurality of candidate values for the target operation parameter of the device on the basis of the index value of the first performance index.

3. The method of claim 1, wherein before updating the superiority of the one candidate value selected on the basis of the index value of the first performance index, the method further comprises:
- in a case where the set value of the target operation parameter after the adjustment does not match a set value of the target operation parameter before the adjustment, acquiring an index value of a second performance index of the device; and
- wherein in a case where the index value of the second performance index indicates that performance of the device is qualified, updating the superiority of the one candidate value selected on the basis of the index value of the first performance index comprises:
- acquiring an index value of a third performance index of the device; and
- updating the superiority of the one candidate value selected on the basis of the index value of the first performance index according to the index value of the third performance index.

4. The method of claim 3, wherein after acquiring the index value of the second performance index of the device, the method further comprises:
- in a case where the index value of the second performance index indicates that the performance of the device is not qualified, restoring the set value of the target operation parameter to the set value of the target operation parameter before the adjustment; and
- wherein updating the superiority of the one candidate value selected on the basis of the index value of the first performance index comprises:
- reducing the superiority of the one candidate value selected on the basis of the index value of the first performance index.

5. The method of claim 3, wherein the first performance index and the second performance index are performance indexes of a cell, and the third performance index comprises performance indexes of a same type of the cell and an intra-frequency neighboring cell; wherein the device is a base station.

6. The method of claim 3, wherein updating the superiority of the one candidate value selected on the basis of the index value of the first performance index according to the index value of the third performance index comprises:
- acquiring an adjustment value of superiority according to the index value of the third performance index; and
- updating the superiority of the one candidate value selected on the basis of the index value of the first performance index according to the adjustment value of the superiority.

7. The method of claim 4, wherein reducing the superiority of the one candidate value selected on the basis of the index value of the first performance index comprises:
- reducing the superiority of the one candidate value selected on the basis of the index value of the first performance index according to a preset adjustment value of the superiority.

8. The method of claim 1, wherein selecting one candidate value according to the searched superiority of each of the plurality of candidate values comprises:
- determining a selection manner of the one candidate value based on an $\varepsilon$ greedy algorithm; wherein the selection manner is random selection or selection according to the searched superiority of each of the plurality of candidate values; and
- selecting the one candidate value from the plurality of candidate values according to the selection manner.

9. The method of claim 1, wherein the device is a base station, the first performance index is an uplink block error rate of a cell, and the target operation parameter is uplink transmit power; or, the first performance index is a resource block utilization rate of the cell, and the target operation parameter is a parameter that characterizes user migration management of the cell.

10. A server, comprising:
- at least one processor; and
- a memory communicatively connected to the at least one processor, wherein the memory stores instructions executable by the at least one processor, and the instructions are executed by the at least one processor to enable the at least one processor to perform the parameter adjustment method of claim 1.

11. A non-transitory computer-readable storage medium storing a computer program, wherein the computer program, when executed by a processor, performs the parameter adjustment method of claim 1.

* * * * *